(12) United States Patent
Kawasaki

(10) Patent No.: US 8,985,888 B2
(45) Date of Patent: Mar. 24, 2015

(54) JOINT TYPE PREFAB ASSEMBLY

(75) Inventor: Hideki Kawasaki, Ritto (JP)

(73) Assignee: Empire Technology Development LLC, Wilmington, DE (US)

( * ) Notice: Subject to any disclaimer, the term of this patent is extended or adjusted under 35 U.S.C. 154(b) by 248 days.

(21) Appl. No.: 13/379,211

(22) PCT Filed: Apr. 7, 2011

(86) PCT No.: PCT/US2011/031605
§ 371 (c)(1),
(2), (4) Date: Dec. 19, 2011

(87) PCT Pub. No.: WO2012/138342
PCT Pub. Date: Oct. 11, 2012

(65) Prior Publication Data
US 2012/0255158 A1    Oct. 11, 2012

(51) Int. Cl.
*F16B 19/02* (2006.01)
*E04B 1/61* (2006.01)
*F16B 5/00* (2006.01)
(Continued)

(52) U.S. Cl.
CPC .............. *E04B 1/6137* (2013.01); *E04B 1/6129* (2013.01); *E04B 1/615* (2013.01); *E04B 1/6158* (2013.01); *F16B 5/0016* (2013.01); *F16B 21/082* (2013.01); *E04B 2001/6195* (2013.01);
(Continued)

(58) Field of Classification Search
CPC .... F16B 5/0016; F16B 21/086; F16B 21/078; E04F 2201/0115; E04F 2201/03; E04F 2201/043; E04F 2201/05; E04F 2201/0535; E04F 2201/0547; E04B 1/48; E04B 1/6219; E04B 1/615; E04B 2001/3276; E04B 2002/0202; E04B 2002/0245; E04B 2002/0234; E04B 2002/0247
USPC .............. 403/361, 231, 252, 253, 263, 359.4, 403/146, 166, 145; 52/585.1, 585.2, 285.1, 52/285.2, 285.3; 74/89.42
See application file for complete search history.

(56) References Cited

U.S. PATENT DOCUMENTS 1,723,306 A * 8/1929 Sipe ........................... 52/396.04
3,760,547 A * 9/1973 Brenneman ................. 52/586.1
(Continued)

FOREIGN PATENT DOCUMENTS

JP    2009197418 A    9/2009
WO   WO2008004960   *  1/2008

OTHER PUBLICATIONS

International Search Report dated Oct. 11, 2011 as received in related application No. PCT/US2011/031605.
(Continued)

*Primary Examiner* — Joshua Kennedy
(74) *Attorney, Agent, or Firm* — Maschoff Brennan

(57) ABSTRACT

A modular connector and modular bolt can be adapted to connect first and second prefabricated building components together. The modular connector can include a recess having a multistage notch structure that can be coupled with protrusions of a modular bolt. The chamber can also include a moveable butting element that is operably coupled with the multistage notch structure, where the moveable butting element can be adapted to move further into the chamber when the modular bolt is received by the multistage recess structure such that a relative position of the second prefabricated building component is adjustable with respect to the first prefabricated building component.

19 Claims, 8 Drawing Sheets

(51) Int. Cl.
*F16B 21/08* (2006.01)
*F16B 21/07* (2006.01)

(52) U.S. Cl.
CPC ............... *F16B 19/02* (2013.01); *F16B 21/078* (2013.01); *F16B 21/086* (2013.01)
USPC ........................... 403/361; 403/263; 52/585.1

(56) References Cited

U.S. PATENT DOCUMENTS

| | | | |
|---|---|---|---|
| 3,826,053 A * | 7/1974 | Cameron | 52/309.1 |
| 4,004,387 A * | 1/1977 | Ellingson | 52/309.3 |
| 4,299,070 A * | 11/1981 | Oltmanns et al. | 52/309.11 |
| 4,455,104 A | 6/1984 | Weisbach | |
| 4,575,295 A | 3/1986 | Rebentisch | |
| 4,701,066 A * | 10/1987 | Beam et al. | 403/298 |
| 4,863,303 A * | 9/1989 | Croucher et al. | 403/11 |
| 5,247,773 A * | 9/1993 | Weir | 52/592.3 |
| 6,761,008 B2 * | 7/2004 | Chen et al. | 52/586.1 |
| 7,246,547 B2 * | 7/2007 | Van Walraven | 81/461 |
| 2002/0189190 A1 * | 12/2002 | Charmat et al. | 52/586.2 |
| 2009/0241460 A1 * | 10/2009 | Beaulieu | 52/586.2 |
| 2013/0149029 A1 * | 6/2013 | Changsrivong et al. | 403/361 |

OTHER PUBLICATIONS

"Goldsworthy Green Housing Technology" Innovative Housing Fabrication Technology, Retrieved on Aug. 26, 2010 <http://www.housing.nu/>.

* cited by examiner

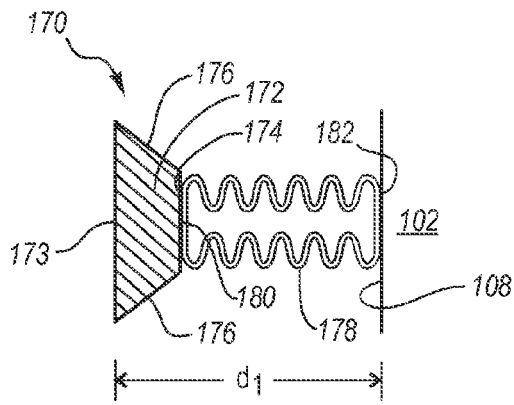
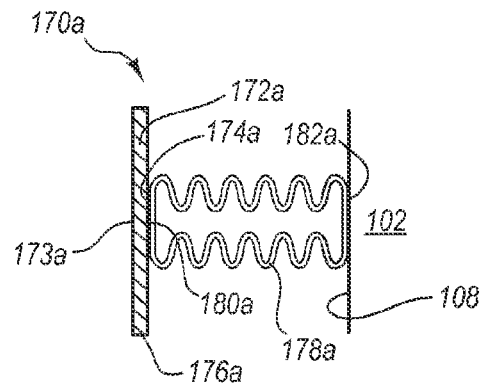
FIG. 1C          FIG. 1D
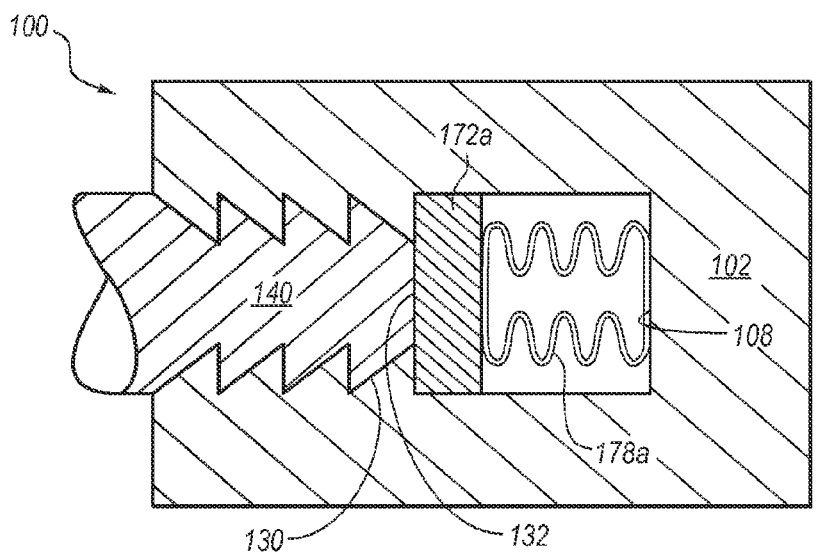
FIG. 1E
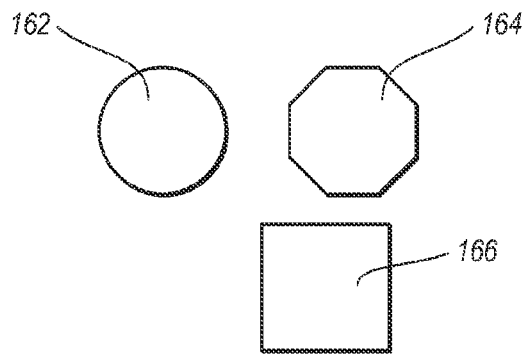
FIG. 1F

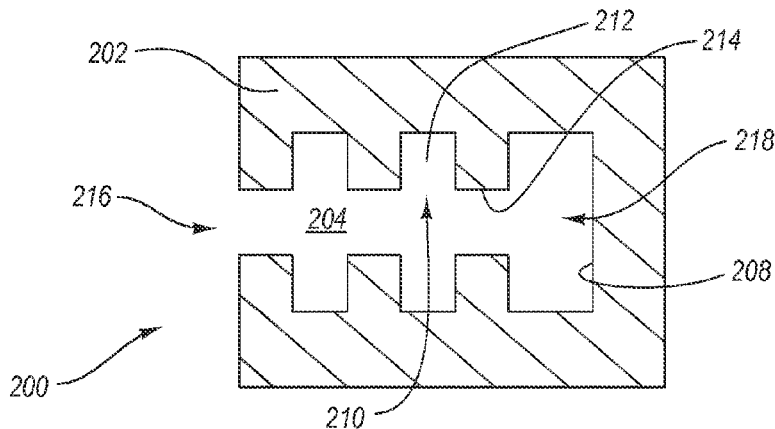
FIG. 2A
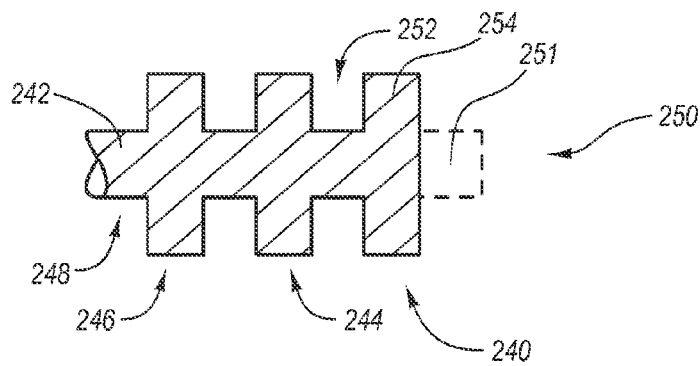
FIG. 2B
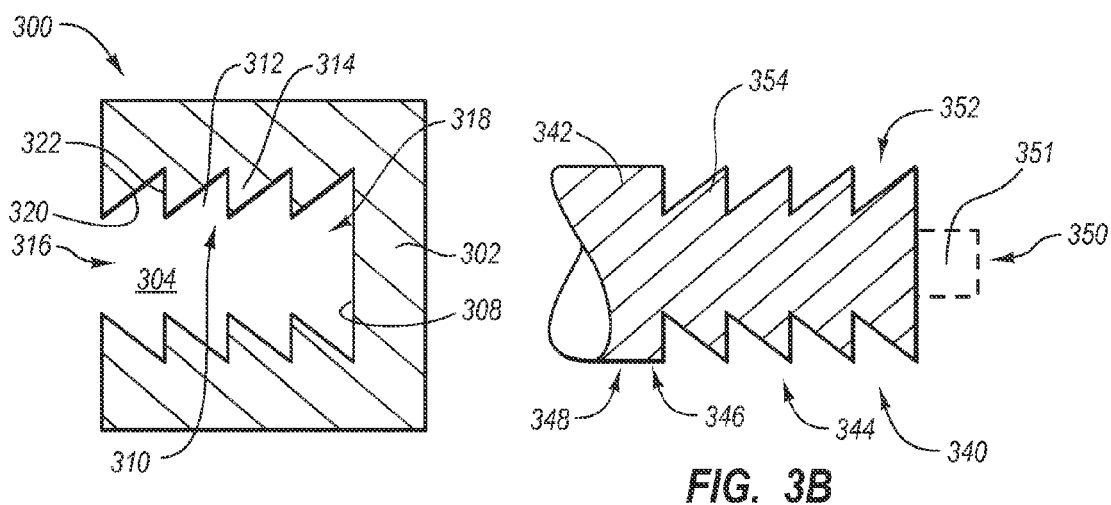
FIG. 3A
FIG. 3B

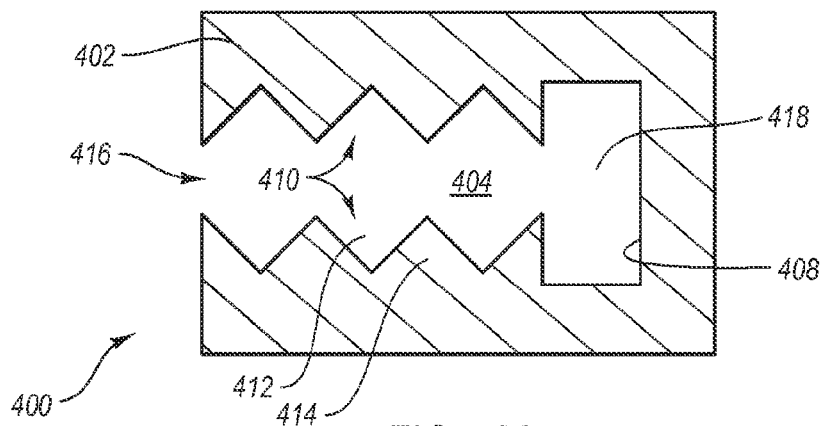
FIG. 4A
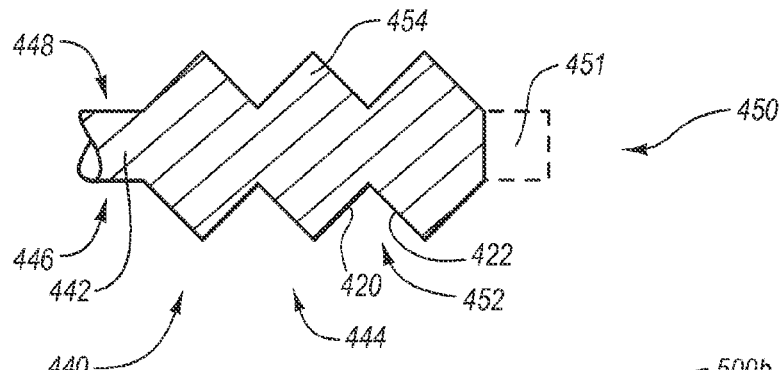
FIG. 4B
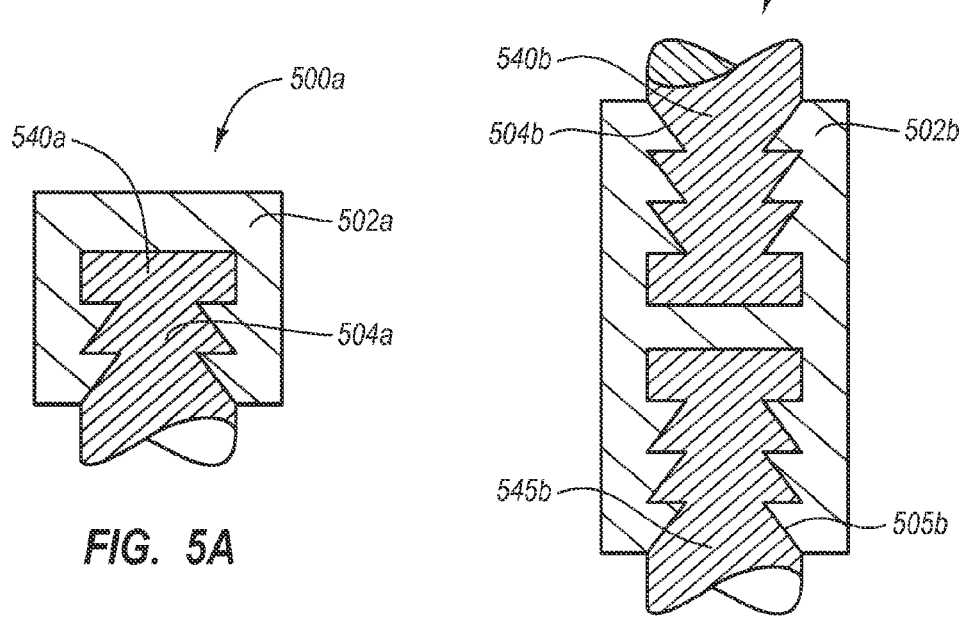
FIG. 5A
FIG. 5B

JOINT TYPE PREFAB ASSEMBLY

BACKGROUND

Prefabricated buildings are dwellings that have various building structures or modular components that are pre-manufactured off-site in advance, usually in standard modules that can be easily shipped and assembled on-site into the final building structure. These modular components are sectional prefabricated building structure sections that are prepared as a combination of building modules or sections that are manufactured in a manufacturing facility, and then delivered to their intended site for construction into a final building structure. The modular components are jointed together using various construction techniques in order to produce a final building structure at the building site. The modules can be assembled into a single building using various types of construction equipment that can hold the modules together in order to be joined together using various joining techniques.

The modular components are typically constructed within a large indoor facility on assembly lines. Such facilities use an assembly line track to move the modules from one workstation to the next. These modules can take one to three months to be constructed, but may take much less time to join together into a final building structure. The placement of the modular components together generally takes several hours or days. Once assembled, modular buildings are essentially indistinguishable from typical site-built homes.

Prefabricated modular buildings are advantageous in that factory production ensures consistent quality and mass supply. However, since all of the modular components are standardized and produced in a factory, the degree of on-site freedom of adjustment and construction is low, and special skills are required for assembly.

SUMMARY

In one embodiment, a modular building can be prepared by using prefabricated modular building components, such as prefabricated modular walls and columns. The modular columns can provide coupling between modular walls, wherein the columns can be support columns and the walls can be wall panels; however, the wall panels may also be configured to have sufficient structural integrity and support. Any other type of prefabricated building components can also be adapted as described herein. The modular building components can be coupled together using a modular connector system as described herein.

A modular connector for attaching such prefabricated modular building components together can include a body structure defining a chamber with a surface shaped as a multistage notch structure having one or more recesses that are operably coupled to a movable butting element that is received by one or more of the recesses or received into a headspace. The body structure can be adapted to connect to a first prefabricated building component. A multistage notch structure can be integrated or coupled with the body structure. The multistage notch structure can have one or more recesses adapted to receive one or more protrusions of a multistage protrusion structure of a modular bolt that is integrated or coupled with a second prefabricated building component. The one or more recesses of the multistage notch structure can be adapted to connect and mate with one or more protrusions of the multistage protrusion structure of the modular bolt that correspond to the one or more recesses so as to interlock the modular connector to the modular bolt through coupling of the multistage notch structure with the multistage protrusion structure. A moveable butting element can be located in the chamber so as to be operably coupled with the multistage notch structure. The moveable butting element can be adapted to move further into the chamber of the modular connector when the multistage protrusion structure of the modular bolt is received by the multistage recess structure of the modular connector. The moveable butting element can include a biasing element that can be biased against an end wall upon receiving the modular bolt. The moving of the moveable butting element can facilitate coupling between two or more prefabricated building components. The coupling through the modular connector and modular bolt coupling allows for adjustment such that a relative position of the second prefabricated building component is adjustable with respect to the first prefabricated wall or prefabricated column.

In one embodiment, a modular system can be provided for attaching prefabricated building components, such as modular walls and columns, together. The modular system can include: a first prefabricated building component; a second prefabricated building component; a modular connector that is connectable or connected to the first prefabricated building component column; and a modular bolt that is connectable or connected to the second prefabricated building component. The modular connector can include: a body structure having a chamber with a multistage notch structure that is integrated with or coupled to the body structure defining the chamber; the multistage notch structure can have one or more recesses with one or more surfaces that define the one or more recesses; and a moveable butting element can be located within the chamber so as to be operably coupled to the multistage notch structure. The moveable butting element can be adapted to move further into the chamber so as to expose one or more of the recesses that are configured for receiving protrusions of a multistage protrusion structure of a modular bolt. The modular bolt can include a multistage protrusion structure having one or more protrusions that are adapted to be received by the one or more recesses. Upon coupling, the protrusions can contact and couple with the recesses to interlock the multistage protrusion structure of the modular bolt with the multistage notch structure of the modular connector. The modular bolt can be adapted to contact and move the moveable butting element further into the chamber of the modular connector such that a relative position of the second prefabricated building structure is adjustable with respect to the first prefabricated building structure, or vice versa.

In one embodiment, a method can use the modular connector and modular bolt for connecting prefabricated building components, such as modular walls and columns, together. Such a method of using the modular connector and modular bolt can include: connecting a first prefabricated building component to a second prefabricated building component, the first prefabricated building component having a modular connector with a chamber that includes a moveable butting element therein, and the second prefabricated building component can have a modular bolt adapted to be connected to the modular connector; fixing the first and second prefabricated building components into a selected position; and adjusting the second prefabricated building component relative to the first prefabricated building component by causing one or more protrusions of the modular bolt to move into the chamber of the modular connector so as to contact and/or move the moveable butting element further into the chamber such that a desired number of recesses of the modular connector are exposed for interlocking with one or more protrusions of the modular bolt; and fixing the moveable butting element, such that the moveable butting element is no longer moveable.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1C illustrates an embodiment of a movable biased butting structure;

FIG. 1D illustrates another embodiment of a movable biased butting element;

FIG. 1E shows a modular connector having a movable biased butting structure biasing a modular bolt;

FIG. 1F shows some examples of cross-sectional profiles of a modular bolt;

FIG. 2A illustrates another embodiment of a modular connector;

FIG. 2B illustrates another embodiment of a modular bolt that is configured to be received into the squared multistage notch structure;

FIG. 3A illustrates another embodiment of a modular connector;

FIG. 3B illustrates another embodiment of a modular bolt that is configured to be received into the reverse multistage notch structure;

FIG. 4A illustrates another embodiment of a modular connector;

FIG. 4B illustrates another embodiment of a modular bolt that is configured to be received into a toothed multistage notch structure;

FIGS. 5A-5D illustrate embodiments of modular connectors coupled to modular bolts, where FIG. 5A illustrates an embodiment of a modular connector having 1 chamber, FIG. 5B illustrates an embodiment of a modular connector having 2 inline chambers, FIG. 5C illustrates an embodiment of a modular connector having 2 orthogonal chambers, FIG. 5D illustrates an embodiment of a modular connector having 3 chambers in a "T" configuration.

FIG. 6A illustrates an embodiment of a modular bolt having 2 multistage protrusion structures, FIG. 6B illustrates an embodiment of a modular bolt having 3 multistage protrusion structures in a "T" configuration, and FIG. 6C illustrates an embodiment of a modular bolt having 4 multistage protrusion structures in a cross configuration;

Figure 1A:
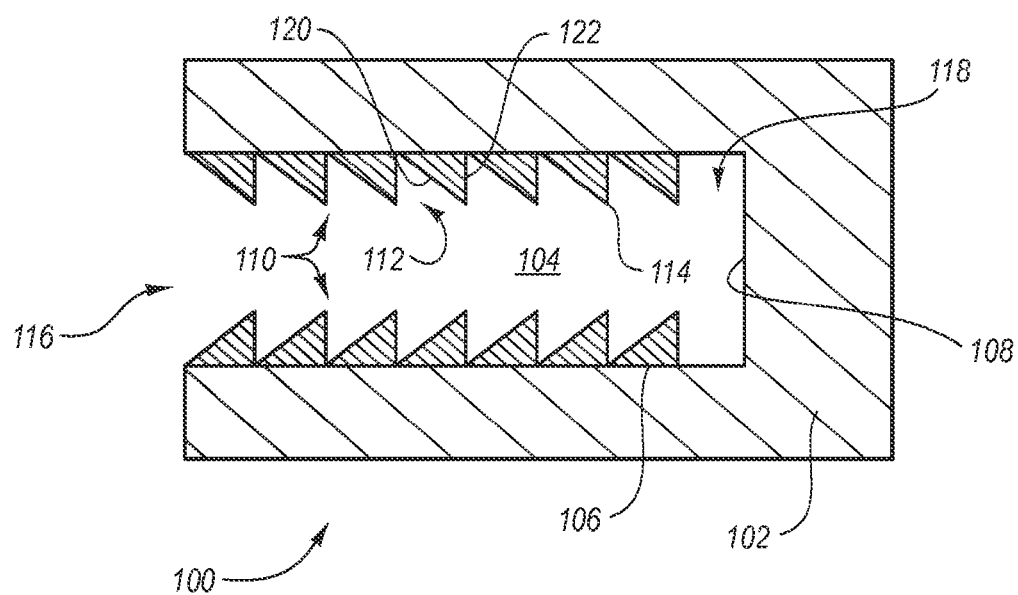
FIG. 1A illustrates a modular connector that can be used for coupling modular building components together in order to construct a building structure on site.

all arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present disclosure is related to modular connectors, columns and walls having the modular connectors and modular bolts that couple with the modular connectors, systems having the modular connectors and bolts, and methods of manufacturing the same as well as methods of manufacturing structures therefrom. The modular connector can be configured for attaching prefabricated walls and columns together with a modular bolt adapted to be received into the modular connector.

Figure 1B:
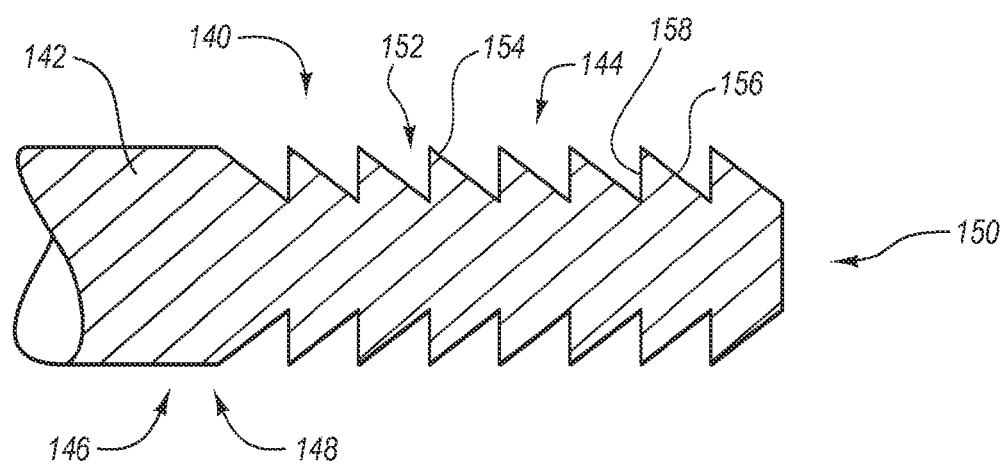
FIG. 1B illustrates a modular bolt that is configured for being received into the modular connector to facilitate coupling of the modular building components.

FIG. 1A illustrates a modular connector 100 that can be used for coupling modular building components together in order to construct a building structure on site. FIG. 1B illustrates a modular bolt 140 that is configured for being received into the modular connector 100 to facilitate coupling of the modular building components. The modular connector 100 can include a body 102 having a structure that is adapted to connect to one or more building components, such as prefabricated walls or prefabricated columns, together. The modular connector 100 can be integrated with the fabricated building component or removably coupled thereto. The modular connector 100 can include an internal chamber 104 defined by a chamber wall 106, where the chamber 104 has an opening 116. The chamber wall 106 can include or be associated with an end wall 108 that is opposite of the opening 116. The end wall 108 can provide one end of a head space 118. The chamber wall 106 can include a multistage notch structure 110 that interacts with the modular bolt 140 in order to couple the modular connector 100 with the modular bolt 140. Correspondingly, the modular bolt 140 can also include a multistage protrusion structure 144 that is complementary to the multistage notch structure 110 of the modular connector 100. When the chamber 104 receives the modular bolt 140 therein, the multistage notch structure 110 receives and mates with the multistage protrusion structure 144. The multistage notch structure 110 can be integrated with the chamber wall 106 of the body 102, or it can be fabricated as a separate structure that is coupled to the chamber wall 106 of the body 102. The head space 118 can be located between the multistage notch structure 110 and the end wall 108.

The multistage notch structure 110 of the modular connector 100 can include one or more recesses 112 and one or more ridges 114 adapted to receive complementary features such as protrusions 154 and troughs 152 of a modular bolt 140. The multistage notch structure 110 can include a slope surface 120 and a lateral surface 122 that cooperate to form the one or more recesses 112 and one or more ridges 114. The multistage protrusion structure can include a slope surface 156 and a lateral surface 158 that cooperate to form the one or more protrusions 154 and troughs 152. It should be noted that the slope surfaces 120 of the multistage notch structure 110 correspond and couple with the slope surfaces 156 of the multistage protrusion structure 144. Also, the lateral surfaces 122 of the multistage notch structure 110 correspond and coupled with the lateral surfaces 158 of the multistage protrusion structure 144. The recesses 112 and ridges 114 formed by the multistage notch structure 110 can be substantially complementary as or the same as the troughs 152 and protrusions 154 of the multistage protrusion structure 144, where the terms are different for ease of referencing the features of the modular connector 100 or the modular bolt 140.

As shown in FIG. 1B, the modular bolt 140 can include a body 142 having the multistage protrusion structure 144 formed of troughs 152 and protrusions 154 defined by the slope surface 156 and the lateral surface 158. The modular bolt 140 is modular in as such as it is operable and/or included in a modular system with the modular connector 100. The modular bolt 140 body 102 can include a bolt shaft 146 that lacks the features of the multistage protrusion structure 144. The bolt shaft 146 is shown to be smooth. The multistage protrusion structure 144 can include a base end 148 that is opposite of a head end 150. The head end 150 of the modular bolt 100 can be received into any of the recesses 112, or even into the head space 118 of the modular connector 100.

FIG. 1C illustrates an embodiment of a movable biased butting structure 170 that can be coupled to the end wall 108 of a chamber 104, such that the modular connector 100 can include the moveable biased butting structure 170 within the chamber 104 as shown in FIG. 1E. The movable biased butting structure 170 can be located in the chamber 104 of the modular connector 100 opposite of the opening 116. The portion of the chamber 104 adjacent to the end wall 108 can be considered to be a head space 108 as it can receive the head end 150 of the modular bolt 140. The movable biased butting structure 170 can have a butting element 172 and a biasing element 178 coupled together and coupled to the end wall 108 of the chamber 104 of the modular connector 100. The butting element 172 can include a butting surface 173, side surfaces 176, and a biased surface 174, where the biasing element 178 is coupled to the biased surface 174. The biasing element 178 can also be coupled to the end wall 108. The coupling between the biased surface 174 and the biasing element 178 as well as the coupling between the biasing element 178 and end wall 108 can be any type of a coupling 180 through some affixation, such as a weld, brazing, adhesive, fastener, or other coupling, as well as through a friction coupling. A friction coupling can be obtained by the biasing element 178 pushing on the biased surface 174, and the butting surface 173 butting against a lateral surface 122 of the multistage notch structure 110 and/or against the head end 150 of the modular bolt 140. Friction coupling between the biasing element 178 and the end wall 108 is also possible.

The movable biased butting element 170 is shown to have a dimension dl from the head wall 108 to the butting surface 173. This dimension dl can vary depending on the size of the modular connector 100. Also, the dimension dl can vary when a force is applied to the butting surface 173 so as to collapse the biasing element 178. The butting element 172 can be dimensioned such that the biasing element 178 can push the butting element 172 all the way to the opening 116 of the chamber 104. The butting element 172 can be fit between any of the lateral recesses 112. The cross-sectional profile of the butting element 172 can be modified so that the butting element can be biased to the opening 116 so that the dimension dl is as large as possible or oppositely biased by a modular bolt 140 so as to reduce the dimension dl to as small as possible.

FIG. 1D illustrates another embodiment of a movable biased butting element 170a, which includes a butting element 172a that is rectangular instead of being a trapezoid as shown in FIG. 1C. The movable biased butting element 170a can include a butting element 172a and a biasing element 178a coupled together and coupled to the end wall 108 of the chamber 104 of the modular connector 100. The butting element 172a can include a butting surface 173a, side surfaces 176a, and a biased surface 174a, where the biasing element 178a is coupled to the biased surface 174a at a coupling 180a. The biasing element 178a can also be coupled to the end wall 108 at a coupling 180a. These couplings can be substantially as described in connection with FIG. 1C.

Additionally, the cross-sectional profile of the butting element 172 can be a trapezoid or rectangle as shown, or it can be any shape and/or dimension. The butting element 172 can also fit within any of the recess 112 pairs and extend across the chamber 104. The lateral dimension of the butting element 172 can extend laterally from a recess 112 to a lateral recess, or it can extend laterally from a tip of a ridge 114 to a tip of a lateral ridge 114. While the butting element 172 is shown to extend all the way across the chamber 104 so as to touch opposite sides 106, the butting element 172 may also be narrower so that it can fit between the tips of lateral ridges 114.

The movable biased butting structure 170 can be operably coupled to the multistage notch structure 110. The moveable biased butting element 170 can be adapted to move when the modular bolt 140 is received into the chamber 104 such that the multistage protrusion structure 144 is coupled to and received by the multistage notch structure 110. The movable biased butting structure 170 can apply a force to the modular bolt 140 to hold the modular bolt 140 within the chamber 140 of the modular connector 100.

FIG. 1E shows the modular connector 100 having the movable biased butting structure 170 biasing a modular bolt 140. As shown, the modular connector 100 includes the modular bolt 140 within the chamber 104 such that the multistage notch system 110 couples with the multistage protrusion system 140 so as to form an interface 130 therebetween. Also shown is the butting element 172a butting against the head end 150 of the modular bolt 140 so as to form a butting interface 132. The volume of the head space 118 can be varied when the modular bolt 140 pushes the butting element 172 toward the end wall 108.

FIG. 1F shows some examples of cross-sectional profiles of the modular bolt 140, however, other cross-section profiles are possible. As shown, the modular bolt can have a circular cross-sectional profile 162, an octagon cross-sectional profile 162, or a square cross-sectional profile 166. The cross-sectional profile can be any polygon, such as rectangular, triangular, or other. The cross-sectional profile of the chamber 104 is adapted to receive the cross-sectional profile of the modular bolt 140, or vice versa.

FIG. 2A illustrates another embodiment of a modular connector 200. The modular connector 200 can include a body 202 that defines a chamber 204 having an opening 216 and opposite end wall 208. The body 202 can also define a squared multistage notch structure 210, where the recesses 212 and ridges 214 are substantially square. The head space 218 is between the multistage notch structure 210 and the end wall 208.

FIG. 2B illustrates another embodiment of a modular bolt 240 that is configured to be received into the squared multistage notch structure 210. The modular bolt 240 can include a body 242 that defines a squared multistage protrusion structure 244 having squared troughs 252 and squared protrusions 254 from a base end 246 to a head end 250. Optionally, the head end 250 can include a push member 251 (e.g., as shown by the dashed lines) at its end, which push member 251 can push against the butting surface 173 of a butting element 172. The push member 251 can be integral with the body 242 or coupled thereto. The squared multistage notch structure 210 can be adjacent to a bolt section 248 of the modular bolt 240.

FIG. 3A illustrates another embodiment of a modular connector 300. The modular connector 300 can include a body 302 that defines a chamber 304 having an opening 316 and opposite end wall 308. The body 302 can also define a reverse multistage notch structure 310, where the recesses 312 and ridges 314 are oriented in a reverse direction compared to the recesses 112 and ridges 114 of the modular connector 100 of FIG. 1A. For example, the slope surface 320 and lateral surface 322 are arranged oppositely of the slope surface 120 and lateral surface 122 of the modular connector 100 of FIG. 1A. The head space 318 is shown to have a trapezoid shape, and is between the reverse multistage notch structure 310 and the end wall 308.

FIG. 3B illustrates another embodiment of a modular bolt 340 that is configured to be received into the reverse multistage notch structure 310. The modular bolt 340 can include a body 342 that defines a reverse multistage protrusion structure 344 having troughs 352 and protrusions 354 from a base end 346 to a head end 350. Optionally, the head end 350 can include a push member 351 (e.g., as shown by the dashed lines) at its end, which push member 351 can push against the butting surface 173 of a butting element 172. The reverse multistage notch structure 310 can be adjacent to a bolt section 348.

FIG. 4A illustrates another embodiment of a modular connector 400. The modular connector 400 can include a body 402 that defines a chamber 404 having an opening 416 and opposite end wall 408. The body 402 can also define a toothed multistage notch structure 410, where the recesses 412 and ridges 414 are defined by a first slope surface 420 and a second slope surface 422 are arranged to form a toothed pattern as illustrated. The head space 418 is shown to have a rectangle shape, and is between the toothed multistage notch structure 410 and the end wall 408.

FIG. 4B illustrates another embodiment of a modular bolt 440 that is configured to be received into the toothed multistage notch structure 410. The modular bolt 440 can include a body 442 that defines a toothed multistage protrusion structure 444 having troughs 452 and protrusions 454 from a base end 446 to a head end 450. Optionally, the head end 450 can include a push member 451 (e.g., as shown by the dashed lines) at its end, which push member 451 can push against the butting surface 173 of a butting element 172. The toothed multistage notch structure 410 can be adjacent to a bolt section 448.

In one embodiment, a modular connector can include one or more chambers configured for receiving a modular bolt as described herein. For example, a modular connector can have a one or more of multistage notch structures coupled to or integrated with the body structure. The one or more multistage notch structures each can have a one or more of recesses adapted to receive a one or more of protrusions of multistage protrusion structure of a modular bolt.

FIG. 5A illustrates an embodiment of modular system 500a that includes a modular connector 502a having one chamber 504a configured for receiving a complementary modular bolt 540a.

FIG. 5B illustrates an embodiment of modular system 500b that includes a modular connector 502b having two chambers 504b, 505b arranged in a linear format. As such, the two chambers 504b, 505b are arranged opposite to one another. The chamber 504b is configured for receiving a complementary modular bolt 540b, while chamber 505b is configured for receiving a complementary modular bolt 545b.

Figure 5C:
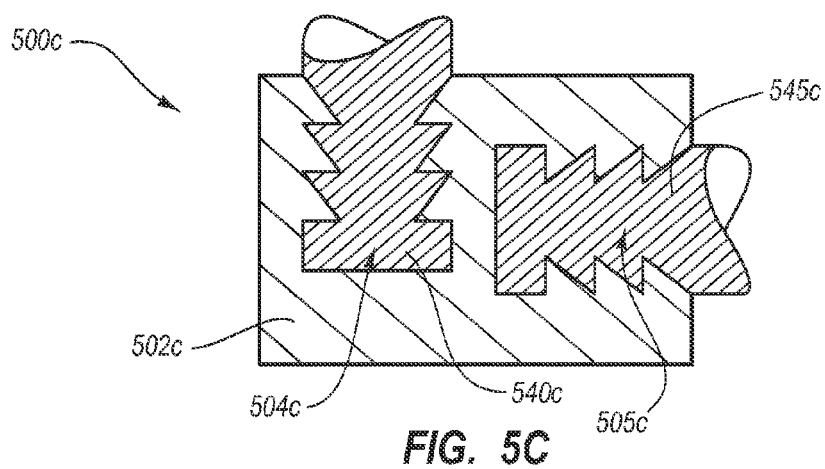

FIG. 5C illustrates an embodiment of modular system 500c that includes a modular connector 502c having two chambers 504c, 505c arranged in an orthogonal or perpendicular format. As such, the two chambers 504c, 505c are arranged in substantially an "L" configuration. The chamber 504c is configured for receiving a complementary modular bolt 540c, while chamber 505c is configured for receiving a complementary modular bolt 545c.

Figure 5D:
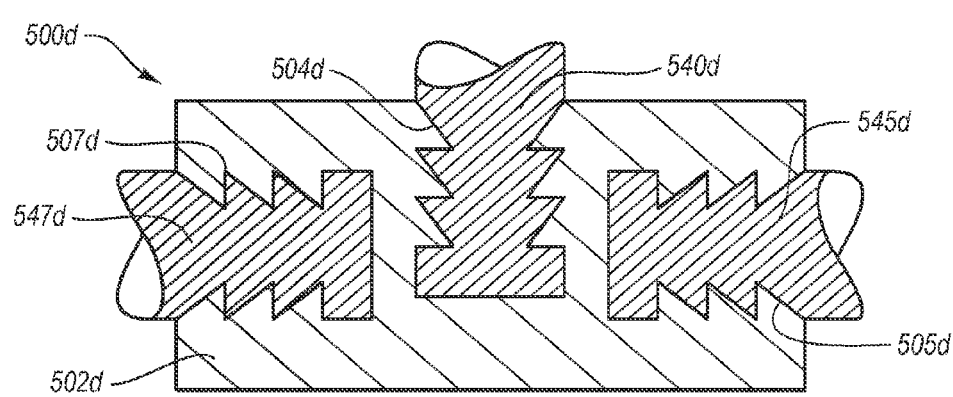

FIG. 5D illustrates an embodiment of modular system 500d that includes a modular connector 502d having three chambers 504d, 505d, 507d arranged in a "T" format. The chamber 504d is configured for receiving a complementary modular bolt 540d, chamber 505d is configured for receiving a complementary modular bolt 545d, and chamber 507d is configured for receiving a complementary modular bolt 547d.

Figure 5E:
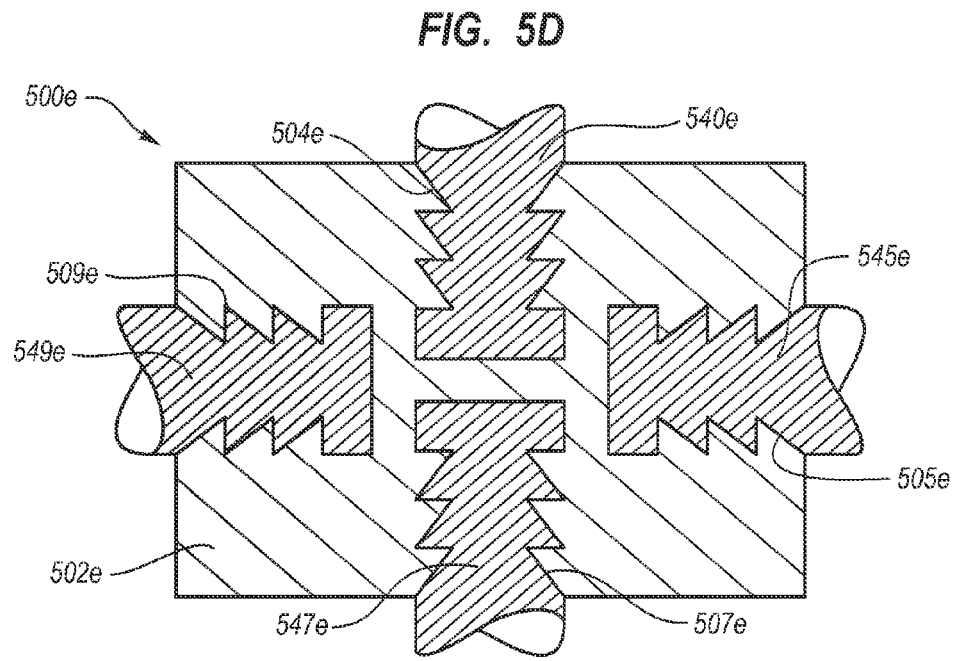
FIG. 5E illustrates an embodiment of a modular connector having 4 chambers in a cross configuration.

FIG. 5E illustrates an embodiment of modular system 500e that includes a modular connector 502e having four chambers 504e, 505e, 507e, 509e arranged in a cross or "+" format. The chamber 504e is configured for receiving a complementary modular bolt 540e, the chamber 505e is configured for receiving a complementary modular bolt 545e, the chamber 507e is configured for receiving a complementary modular bolt 547e, and the chamber 509e is configured for receiving a complementary modular bolt 549e.

The modular connector can be an independent component that is coupled to prefabricated support building components, such as modular columns or walls. The coupling between the modular connector and prefabricated building component can be an affixing that is permanent, or the coupling can be removable. Also, the modular connector can be integrated with the prefabricated building structure. As such, a prefabricated support column or prefabricated wall can be prepared to include one or more modular connectors as described herein.

Figure 6A:
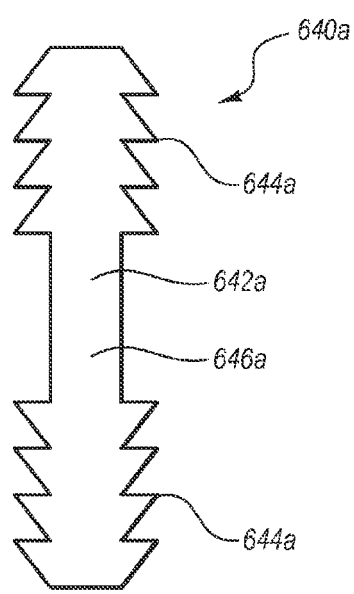
FIGS. 6A-6C illustrates embodiments of modular bolts, where

FIG. 6A illustrates an embodiment of a modular bolt 640a for use with two modular connectors as described herein. The modular bolt 640a includes a body 642a having a shaft 646a connected to two multistage protrusion structures 644a. As shown, the modular bolt 640a is substantially straight or linear.

Figure 6B:
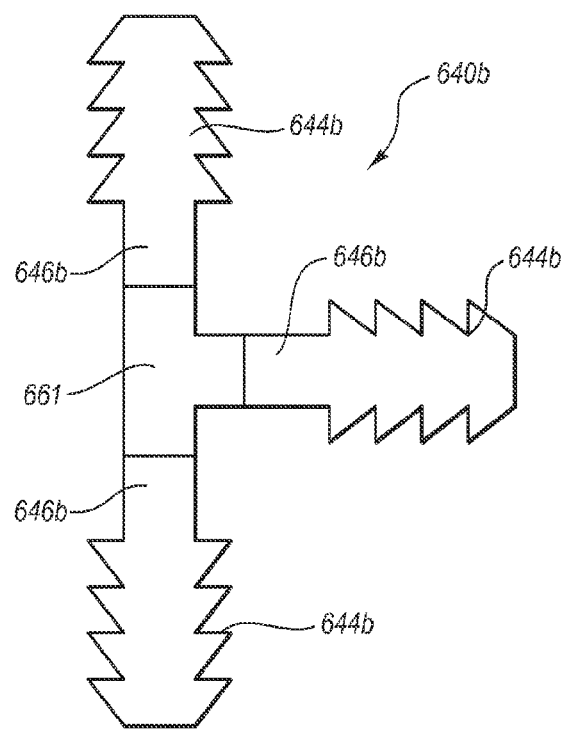

FIG. 6B illustrates an embodiment of a modular bolt 640b for use with three modular connectors as described herein. The modular bolt 640b includes tree shafts 646b that extend into a "T" collar 661 on one end, and have multistage protrusion structures 644b on the other end. The "T" collar 661 is slidable over the shafts 646b such that the multistage protrusion structures 644b can be slide relative to each other for alignment with three different modular connectors.

Figure 6C:
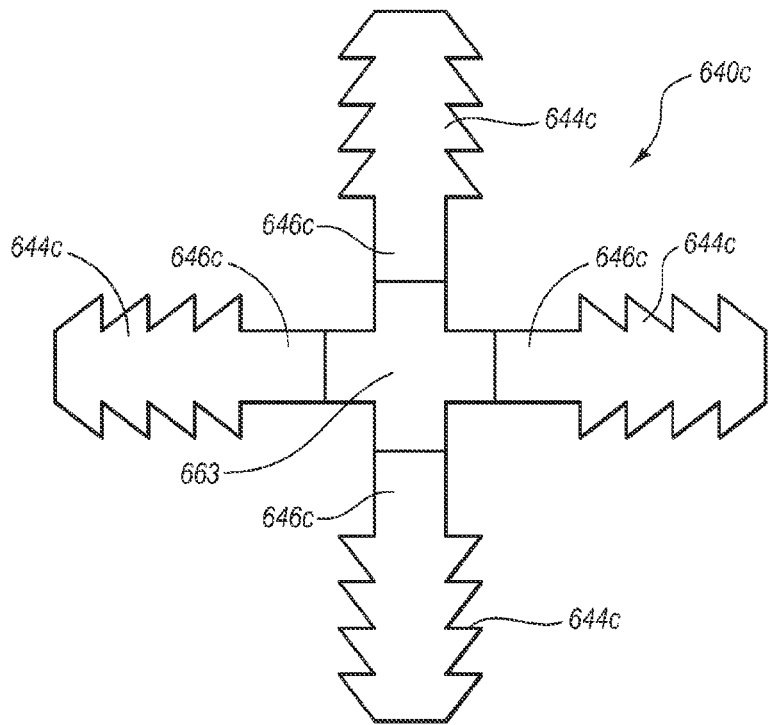

FIG. 6C illustrates a modular bolt 640c for use with four modular connectors as described herein. The modular bolt 640c has four shafts 646c that extend into a cross collar 663 on one end, and have multistage protrusion structures 644c on the other end. The cross collar 663 is slidable over the shafts 646c such that the multistage protrusion structures 644c can be slid relative to each other for alignment with four different modular connectors. Alternatively, the cross collar 663 can be excluded and the shafts 646c can be coupled together.

The modular bolt may also be configured as a protrusion of a prefabricated building structure, such as a wall or column. That is, the modular bolt may protrude from a prefabricated wall or a prefabricated column so that one end is within the prefabricated wall or prefabricated column and the other end has a free multistage protrusion structure that can be received into a chamber of a modular connector.

The various components of the modular connector, such as the body, multistage notch structure, and components of the moveable biased butting structure can be prepared from one or more of various materials that are commonly used in the building manufacturing industry, which includes a wide array of plastics, metals, metal alloys, concrete, wood, ceramics, and composite materials. The modular bolt can also be prepared from one or more of these materials. The modular connector body and multistage notch structure can be prepared substantially from any of these materials that have sufficient strength to function as a connector for coupling support columns to walls in a building structure. The butting element can also be prepared from any of these types of materials. The biasing element can be prepared from a suitable plastic, such as an elastomer, or a suitable metal or metal alloy, such as iron, that can be prepared into a spring or other biasing structure configuration. The material used to prepare the biasing element can be selected to have a compressible modulus that applies a bias to a structure that compresses the biasing element. The material used to prepare the biasing element should be sufficient to provide elasticity, flexibility, resilience, and return pressure when pushed by another member, such as a modular bolt.

Plastics that can be used for the body (e.g., non-biasing plastics) can be substantially rigid so as to be structurally and dimensionally non-deformable. Non-limiting examples of such plastics can include polyacrylates, polyvinylchlorides, polyolefins, polyethylenes, polypropylenes, ethylene-vinyl acetate, polyurethane, poly(methyl methacrylate), polycarbonate, polyester, polyvinylnitrate, polystyrene, or others.

Non-limiting examples of elastomers that can be used for the biasing element can include butyl rubber, cold rubber, ethylene propylene diene monomer rubber (EPDM rubber), ethylene-vinyl acetate, fluoro-elastomers, chlorosulfonated polyethylene (CSPE), silicone rubber, natural rubber, neoprene, nitrile rubber, polybutadiene, polyether block amide, room temperature vulcanization silicone, crosslinked polydimethylsiloxane, silicone rubber, styrene-butadiene, styrene butadiene styrene, thermoplastic polyurethanes, and others.

Non-limiting examples of metals and metal alloys can include aluminum, chromium, cobalt, copper, iron, lead, magnesium, nickel, tin, titanium, zinc, steel, stainless steel, tungsten, alloys thereof, and combinations thereof. Metals and alloys can be prepared into structurally rigid members, such as the body of the modular connector or bolt. Metals and alloys can also be prepared into biasing elements when in the form of a spring or other biasing structure.

Non-limiting examples of ceramics can include alumina oxides, beryllia oxides, ceria oxides, zirconia oxides, carbides, borides, nitrides, silicides, and others.

The composites can be combinations of plastics, metals or alloys, ceramics, woods, or other substances. Composites are considered to be materials that are formed from two or more different types of materials.

Figure 7:
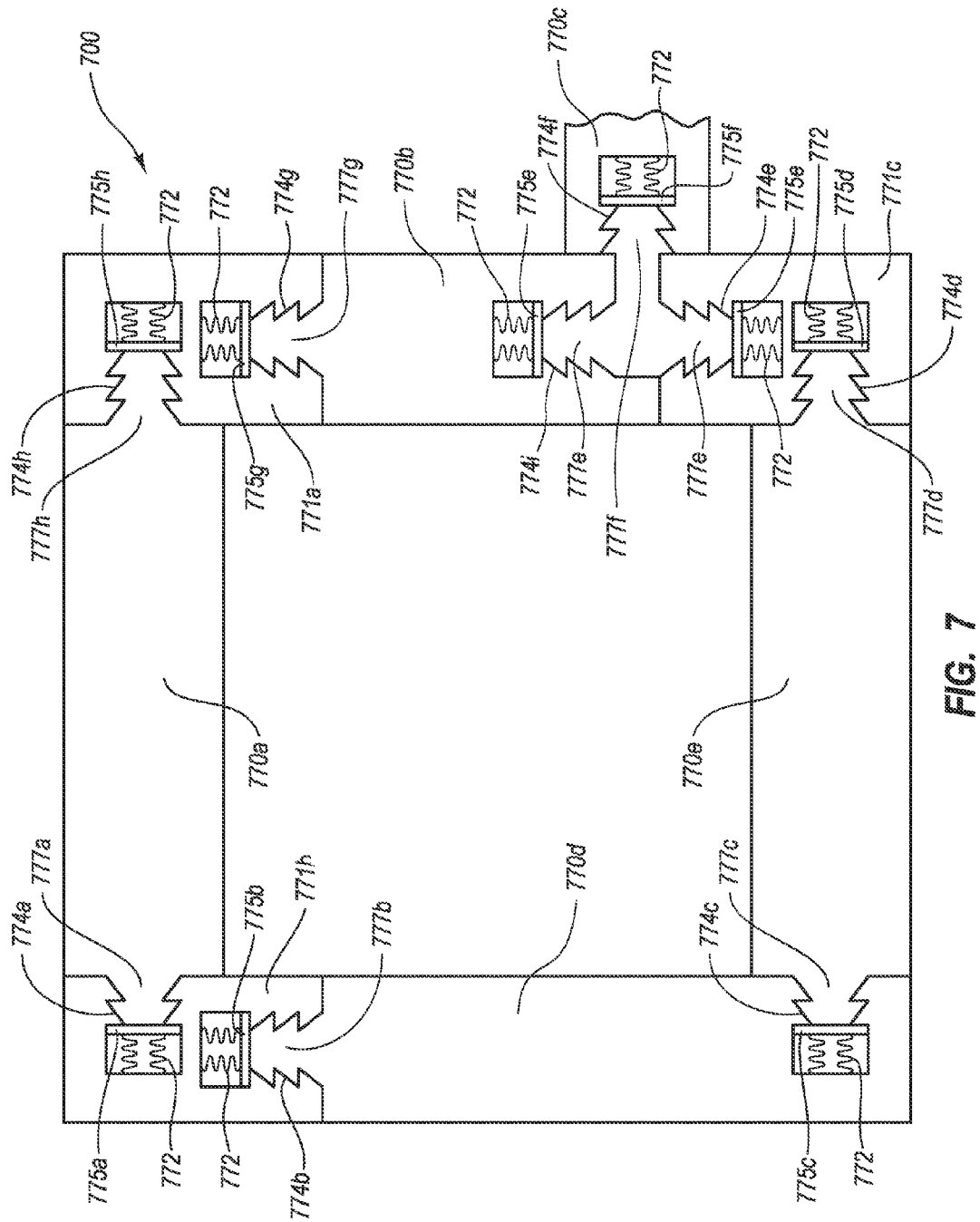
FIG. 7 illustrates an embodiment of a structure constructed of modular connectors and modular bolts.

FIG. 7 illustrates an embodiment of a structure 700 constructed of modular connectors 774 (e.g., a first modular connector 774a) and modular bolts 777 (e.g., a first modular bolt 777a). The modular connectors 774 are shown to be integrated with support columns 771 (e.g., a first support column 771a) or integrated with wall panels 770 (e.g., a first wall panel 770a). Starting at the top center of FIG. 7, the wall panel 770a is shown to be integrated with the modular bolt 777a on one end (e.g., left side) and a modular bolt 777h on the other side (e.g., right side). The modular bolt 777a is received into a modular connector 774a of support column 771b so as to contact a butting element 775a that is biased by a biasing element 772. The modular bolt 777h is received into a modular connector 774h of support column 771a so as to contact a butting element 775h that is biased by a biasing element 772.

The support column 771a also includes another modular connector 774g that receives a modular bolt 777g that is integrated with a wall panel 770b. The modular bolt 777g contacts a butting element 775g that is biased by a biasing element 772.

The wall panel 770b includes a modular connector 774i opposite of the modular bolt 777g. The modular connector 774i receives a modular bolt 777e, which is a three-sided bolt, so as to contact a butting element 775e that is biased by a biasing element 772.

Thus, wall panel 770b has a modular bolt 777g at one end and a modular connector 774i at the other end.

The modular bolt 777e is also received into a modular connector 774f of another wall panel 770c so as to contact a butting element 775f that is biased by a biasing element 772. The modular bolt 777e is also received into a modular connector 774e of support column 771c so as to contact a butting element 775e that is biased by a biasing element 772. The support column 771c also has another modular connector 774d that receives a modular bolt 777d of wall panel 770e so as to contact a butting element 775d that is biased by a biasing element 772.

The wall panel 770e is integrated with another modular bolt 777c opposite of modular bolt 777d. Modular bolt 777c is received into modular connector 774c of wall panel 770d so as to contact a butting element 775c that is biased by a biasing element 772. The wall panel 770d is also integrated with a modular bolt 777b that is received into a modular connector 774b so as to contact a butting element 775b that is biased by a biasing element 772. Accordingly, wall panel 770d has a modular connector 774c on one end and a modular bolt 777b on the other end, where the modular connector 774c and modular bolt 777b are substantially perpendicular.

Figure 8:
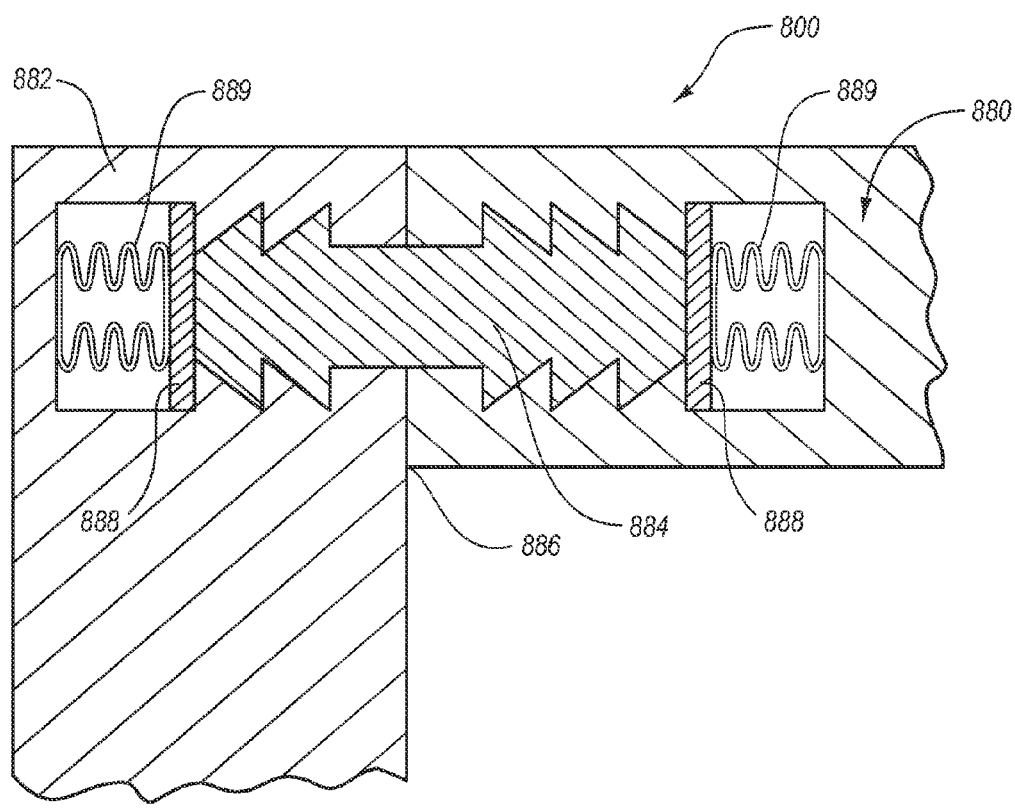
FIG. 8 illustrates an embodiment of a portion of a modular structure prepared from two walls having integrated modular connectors that are connected to modular bolts.

FIG. 8 shows two support walls 880, 882, which are configured to be prefabricated in a manner that the support walls 880, 882 can be connected without a support column. That is, the support walls 880, 882 are suitable for providing support, and are stronger than typical wall panels that are coupled together through support columns. The support wall 880 is configured such that the modular connector is integrated, and the support wall 880 directly receives a modular bolt 884 so as to contact a butting element 888 that is biased by a biasing element. The support wall 882 is similarly configured, and the support wall 882 receives the support bolt 884 so as to contact a butting element 888 that is biased by a biasing element 889. These support walls 880, 882 are configured such that coupling together through a straight modular bolt 884 forms an "L" junction 886.

Figure 9:
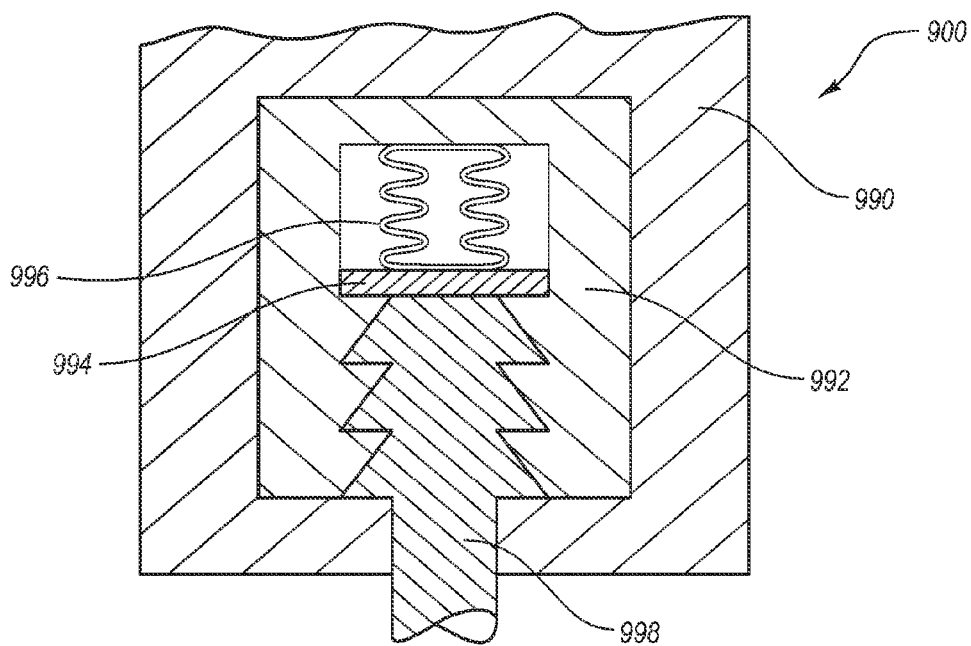
FIG. 9 illustrates an embodiment of a movable modular connector system.

FIG. 9 illustrates an embodiment of a removable modular connector system 900. As shown, the removable modular connector system 900 includes a modular connector 992 that is removably received into a prefabricated building component 990, such as a column or wall. The modular connector 992 includes a butting element 994 that is biased by a biasing element 996. The modular bolt 998 can be inserted into the modular connector 992.

In one embodiment, a prefabricated building component can have one or more modular connectors. The modular connectors can be on different faces of the prefabricated building component. Alternatively, two or more modular connectors can be on the same face, such as a side face or an end face. Also, a prefabricated building component can have one or more modular bolts. The modular bolts can be on different faces of the building component. Alternatively, two or more modular bolts can be on the same face, such as a side face or an end face.

A single modular connector can extend from a top to a bottom of the prefabricated building component, such as a support column or wall. That is, the modular connector has a height dimension substantially the same as the height dimension of a support column or wall. Alternatively, prefabricated building component can have one or more modular connectors on one side face or an end face, such that the modular connectors are stratified with respect to each other. For example, the modular bolts can be similarly arranged and/or dimensioned on support columns or walls. The prefabricated building components can include one modular connector at the top, at the bottom, and at one or more locations therebetween. Modular bolts may also be included at these locations. Each of the modular connectors can have the moveable biased butting structure components as described herein.

In one embodiment, a modular connector can have one or more chambers having the multistage notch structures. In one example, a modular connector can include two chambers having the multistage notch structures arranged linearly, such that the openings of the chambers are opposite of each other and opening away from each other. In one example, a modular connector can include two chambers having the multistage notch structures arranged so that the chambers are substantially orthogonal or perpendicular to each other such that the two different multistage notch structures are located substantially orthogonal or perpendicular to one another. In one example, a modular connector can include three chambers having the multistage notch structures, where the chambers and multistage notch structures are arranged in a "T" arrangement. In one example, a modular connector can include four chambers having the multistage notch structures, where the chambers and multistage notch structures are arranged in a cross arrangement.

In one embodiment, the multistage notch structure can be configured with recesses that are adapted to be exposed for coupling with protrusions of a modular bolt when the moveable butting element is moved toward the end wall of the chamber. Such movement loads the biasing element with more force that is applied to the end of the modular bolt, which holds it in place. For example, the multistage notch structure can be adapted to receive a multistage protrusion structure such that the end of the modular bolt pushes the moveable butting element toward the end wall. The varying number of recesses to accommodate a coupling can allow for adapting the connector to have a secure coupling even in instances building components being coupled together are not perfectly aligned.

In one embodiment, the multistage notch structure can be adapted to receive a multistage protrusion structure at the end of a modular bolt such that at least two surfaces are adapted to engage protrusions on the multistage protrusion structure. As such, there are at least two surfaces of the multistage notched structure that can be moved into a position relative to two surfaces of the multistage protrusion structure such that at least a second protrusion is received in the multistage notch structure.

The modular connector can be further fastened to the modular bolt by using a fixing agent to fix the multistage notch structure to the multistage protrusion structure. The fixing agent and structural materials can be selected to adhere the materials of the structures together. In one example, a cement or concrete mixture can be hydrated and solidified around a coupled modular connector and bolt. The cement or concrete may also be hydrated and solidified in order to backfill the movable butting element. The head space between the butting element and end wall can be filed with the fixing agent, which can be deposited around the biasing element.

In one embodiment, the modular connector and corresponding modular bolt can be configured such that one or more of the multistage notch structure or the multistage protrusion structure can be resiliently deformable so that the multistage protrusion structure can be pushed past the multistage notch structure as the modular bolt is inserted into the modular connector. Elastomeric or flexibly resilient metals or metal alloys can be used for the multistage structures.

In one embodiment, the modular connector and corresponding modular bolt can be configured such that the one or more recesses of the multistage notch structure are slots that extend from a top of the modular connector to a bottom of the modular connector. Similarly, the one or more protrusions of the multistage protrusion structure can be ridges that extend from a top of the modular bolt to a bottom of the modular bolt.

As such, the bottom of a modular bolt can be aligned with a top of a modular connector and the modular bolt can be slid into the modular connector so that the surfaces of the multistage protrusion structure slide down the surfaces of the multistage notch structure.

The dimensions of the modular connector and modular bolt can greatly vary depending on the size of the walls and columns. The relative dimensions of the modular connector and modular bolt can be suitable so that the modular bolt is long enough to be received into a modular connector so as to fix a wall to a column.

The modular connector and modular bolt can be included in a connector system for attaching prefabricated building components, such as modular walls and columns, together during construction of a building. The connector system can include one or more prefabricated building components, such as walls, and one or more prefabricated support building components, such as support columns, adapted to be coupled together with the modular connector and modular bolts described herein. The connector system can include a modular connector connected to the prefabricated building components. The connector system can be configured as any modular connector as described herein.

The modular connector system can also include a modular bolt that can be coupled to one or more modular connectors as described herein. The modular bolt can be a double headed bolt, or it may include 3 heads in a "T" shape, or 4 heads in a cross shape. Also, the modular bolt can be integrated with the prefabricated support column or wall. That is, the prefabricated building components can include the modular bolts mounted thereto. The modular bolts can be at locations on the prefabricated support columns or walls that can be received into modular connectors of support columns or walls that will be coupled together.

The modular bolt can be connected to a prefabricated building structure such that the multistage protrusion structure that are adapted to be received by the multistage notch structure such that the one or more protrusions contact the one or more edges that define the one or more recesses to interlock the modular bolt within the modular connector. The bolt can be configured such that its end can contact and move the moveable butting element toward the end wall of the cavity of the modular connector. The movable butting element moves into the chamber such that a relative position of a modular connector and a modular bolt can be adjustable. Therefore, the adjustability extends to a prefabricated building component that is coupled through a modular connector and modular bolt to another prefabricated building component.

In one embodiment, the multistage notch structure and multistage protrusion structure can include a corresponding or same number of protrusions as the number of recesses of the multistage notch structure. When fully coupled, a head space may be present at the end wall side of the cavity from the coupled multistage structures. The head space is suitable for receiving the fixing agent.

The connector system can include any number of prefabricated building components, such as columns and/or walls, having an arrangement and number of modular connectors that are capable of receiving corresponding modular bolts of connecting prefabricated building components. The columns or walls can include one or more modular connectors located on opposite sides of a body structure. A wall can include one or more modular connectors on each end such that the cavities open away from each other. A wall can include one or more modular bolts on each end such that the bolt heads point away from each other. Similarly, a column can have one or more modular connectors on each face of the column and/or one or more modular bolts on each face. That is, 1, 2, 3, or 4 perpendicular or orthogonal faces of a column can each have one or more modular connectors and/or one or more modular bolts.

In one example, a building can be constructed by using modular connectors and bolts to fasten walls to support columns. The construction procedure can include connecting one or more columns with one or more walls through one or more modular connectors and bolts so as to form exterior frame of the building. The columns can be fixed on the ground, such as to a foundation or footing. The walls can be adjusted relative to the support column and ground by adjusting the modular bolt into or out of the modular connector at each junction. Once the walls and columns are properly aligned, a fixing agent, such as a cement or resin is poured between around the modular bolt within the cavity of the modular connector. The fixing agent can also be filled behind the movable butting elements to the end wall to fill the head space to facilitate proper immobilization of the entire modular building assembly.

The degree of freedom of the building design and remodeling after initial construction can be enhanced using prefabricated support columns equipped with modular connectors and/or bolts on 2, 3, or 4 sides for connection to the interlocking wall panels.

The modular connector system described herein can have advantages in the degree of freedom at a construction site so that walls can be connected relative to columns so that imperfections in alignment can be overcome. The enhanced degrees of freedom can also include replacing one or more prefabricated walls with different prefabricated walls, such as during remodeling of a building.

The adjustability of the modular connector with respect to the modular bolt can improve the flexibility to overcome some errors in the assembly of the prefabricated building components. For example, in traditional method parts of a column or wall panel are precisely designed and cannot be adjusted when assembled with each other at a construction site. As such, errors that case small differences in alignment of columns and walls can leave imperfectly joined walls and columns. Small ground or footing distortions can disrupt overly precise modular components that do not have degrees of freedom and adjustability. The present modular connector and modular bolt system overcomes these problems, and can allow for properly aligned walls and columns even if there are distortions in the ground or footing.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A modular connector for attaching prefabricated walls and columns comprising:
    a body structure having an internal chamber with an opening at one end and a closed base opposite of the opening with a multistage notch structure having a plurality of chamber stages in the internal chamber, each chamber stage has one or more chamber recesses and one or more chamber protrusions;
    a modular bolt having an external multistage protrusion structure with a plurality of bolt stages, each bolt stage has one or more bolt protrusions and one or more bolt recesses, wherein one or more of the bolt stages couple with one or more of the chamber stages when the modular bolt is received into and coupled with the internal chamber; and
    a moveable butting structure having a butting element coupled to a biasing element, the moveable butting structure located within the internal chamber and having the biasing element abutting a surface of the closed base, the moveable butting element being adapted to move toward the base upon being contacted by an end of the modular bolt such that a relative position of the moveable butting element and opening is adjustable.

2. The modular connector of claim 1, wherein each of the one or more chamber recesses of the modular connector comprises a ridge having a sloped surface and a lateral surface.

3. The modular connector of claim 1, wherein the multistage notch structure is a first multistage notch structure and the moveable butting element is a first moveable butting element, the connector further comprising:
    the body structure having a second internal chamber with a second opening at one end and a second closed base opposite of the second opening with a second multistage notch structure having a plurality of second chamber stages in the second internal chamber, each second chamber stage has one or more second chamber recesses and one or more second chamber protrusions; and
    a second moveable butting structure having a butting element coupled to a biasing element, the moveable butting structure located within the second internal chamber and having the biasing element abutting a surface of the second closed base, the second moveable butting element being adapted to move toward the second base such that a relative position of the second movable butting element and second opening is adjustable.

4. The modular connector of claim 3, wherein the first and second multistage notch structures are located substantially perpendicular to one another within the body structure.

5. The modular connector of claim 3, wherein the first and second multistage notch structures are located on opposite sides of the body structure.

6. The modular connector of claim 3, further comprising a third chamber having a third multistage notch structure coupled or integrated with the body structure, and a third moveable butting structure located within the third chamber, the third moveable butting structure having a butting element coupled to a biasing element, wherein the biasing element abuts a surface of a third closed base of the third chamber.

7. The modular connector of claim 1, wherein in a first connector position with the modular bolt coupled with the internal chamber the butting element is at a first chamber stage, in a second connector position the butting element is at the second chamber stage deeper in the internal chamber.

8. The modular connector of claim 1, wherein each chamber stage of the multistage notch structure is adapted to receive a corresponding bolt stage of the multistage protrusion structure of the modular bolt such that the butting element is movable further into the chamber, the movement increasing the number of chamber stages mated with bolt stages.

9. The modular connector of claim 1, wherein each chamber stage has a substantially same lateral chamber recess depth and substantially same chamber protrusion height.

10. The modular connector of claim 1, wherein each chamber stage is evenly spaced from the opening toward the base.

11. The modular connector of claim 1, wherein a first chamber recess of each chamber stage extends circumferentially around at least one chamber side wall at a substantially constant depth from the opening.

12. The modular connector of claim 1, wherein a first chamber protrusion of each chamber stage extends circumferentially around the at least one chamber side wall at a substantially constant depth from the opening.

13. The modular connector of claim 1, wherein the one or more chamber protrusions for each chamber stage define one or more stage apertures.

14. The modular connector of claim 1, wherein each chamber stage has a lateral wall surface and sloped wall surface.

15. The modular connector of claim 14, wherein the sloped wall surface slopes away from the opening and toward the base.

16. The modular connector of claim 14, wherein the sloped wall surface slopes toward the opening and away from the base.

17. The modular connector of claim 1, wherein each chamber stage includes a first sloped wall surface that slopes away from the opening and toward the base and a second sloped wall surface that slopes toward the opening and away from the base.

18. The modular connector of claim 1, wherein each chamber stage includes two lateral walls separated by a longitudinal wall.

19. The modular connector of claim 1, wherein each chamber stage has same shape and dimensions.

* * * * *

UNITED STATES PATENT AND TRADEMARK OFFICE
CERTIFICATE OF CORRECTION

| | |
|---|---|
| PATENT NO. | : 8,985,888 B2 |
| APPLICATION NO. | : 13/379211 |
| DATED | : March 24, 2015 |
| INVENTOR(S) | : Kawasaki |

It is certified that error appears in the above-identified patent and that said Letters Patent is hereby corrected as shown below:

In the Specification

In Column 1, Line 3, below Title, insert -- CROSS-REFERENCE TO RELATED APPLICATION
This application is a U.S. national stage filing under 35 U.S.C. §371 of International Application No. PCT/US2011/031605 filed on Apr. 7, 2011. --.

In Column 9, Line 40, delete "polyvinylnitrate," and insert -- polyvinylnitrate, --, therefor.

Signed and Sealed this
Eleventh Day of August, 2015

Michelle K. Lee
*Director of the United States Patent and Trademark Office*